(12) United States Patent
Mendonca

(10) Patent No.: US 7,895,409 B2
(45) Date of Patent: Feb. 22, 2011

(54) APPLICATION INSPECTION TOOL FOR DETERMINING A SECURITY PARTITION

(75) Inventor: John J. Mendonca, Redwood Shores, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 464 days.

(21) Appl. No.: 11/888,098

(22) Filed: Jul. 30, 2007

(65) Prior Publication Data

US 2009/0037686 A1    Feb. 5, 2009

(51) Int. Cl.
G06F 12/14 (2006.01)
G06F 9/44 (2006.01)

(52) U.S. Cl. .................. 711/173; 711/170; 717/100; 717/120; 717/131; 718/104; 726/1; 726/2; 726/4; 726/17; 726/21

(58) Field of Classification Search .............. 726/17
See application file for complete search history.

(56) References Cited

U.S. PATENT DOCUMENTS

| | | | |
|---|---|---|---|
| 2002/0095593 A1* | 7/2002 | Daniell et al. ............. | 713/200 |
| 2005/0076209 A1* | 4/2005 | Proudler .................... | 713/165 |
| 2006/0075204 A1* | 4/2006 | Kumar ....................... | 711/173 |

OTHER PUBLICATIONS

Making the Adaptive Enterprise Vision a Reality: The HP Partitioning Continuum; Herington, et al.; Oct. 21, 2005.*
HP-UX Security Containment B.11.23.01 Release Notes; HP; 2005.*
"Product Name: ObjectBroker for UNIX, Version 2.7". Retrieved on Jul. 25, 2007. Retrieved from the internet: http://h18000.www1.hp.com/info/sp4707/sp4707pf.pdf. Total pp. 14.
"HP-UX Security Containment B. Nov. 23, 2001 Release Notes". Retrieved on Jul. 25, 2007. Retrieved from the internet: http://docs.hp.com/en/5991-1125/5991-1125.pdf. Total pp. 20.
"Securing Virtual Partitions with HP-UX Role-Based Access Control". Retrieved on Jul. 25, 2007. Retrieved from the internet: http://docs.hp.com/en/6771/rbac.vpars.ed400.pdf. Total pp. 14.
"Making the Adaptive Enterprise Vision a Reality: The HP Partitioning Continuum" by D. Herrington, et al. [webpages] [online]. Retrieved on Jul. 25, 2007. Retrieved from the internet: http://www.phptr.com/articles/printerfriendly.asp?p=419049. Total pp. 21.

* cited by examiner

Primary Examiner—Jack A Lane

(57) ABSTRACT

An embodiment of the invention provides an apparatus and method for determining a security partition in a computer for an application. The apparatus and method can determine required system resources, security requirements, and partition rules for an application, can determine allocated system resources, security characteristics, and partitions rules for each security partition in the computer, and can identify at least one proposed security partition for the application.

20 Claims, 3 Drawing Sheets

APPLICATION INSPECTION TOOL FOR DETERMINING A SECURITY PARTITION

TECHNICAL FIELD

Embodiments of the invention relate generally to an application inspection tool for use with security partitions.

BACKGROUND

Security partitioning is a feature that allows multiple software applications to be placed on a computer (e.g., server) and that isolates the applications from each other. The applications in a security partition will be entitled to resources such as, for example, CPU resources, memory, disk I/O (input/output) resources (e.g., bandwidth), and/or the security features of that security partition. One process (i.e., an instance of an application that is running on a computer) in one security partition is generally not permitted to communicate with a process in another security partition unless a rule has been defined to allow that specific communication to occur. Security partitioning is a feature in, for example, the HP-UX® 11i V2 operating system which is commercially-available from Hewlett-Packard Company, Palo Alto, Calif.

However, a user is required to know the security characteristics or security requirements of the applications that he/she wants to use in the computer, so that he/she can place the applications in the correct security partition with appropriate privileges. These security characteristics or requirements include, for example, user roles, system privileges, file access, memory access, and network access. This task by the user in determining these security characteristics is a trial and error process and requires the user to manually search and examine these characteristics.

Therefore, the current technology is subjected to at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations' are not shown or described in detail to avoid obscuring aspects of embodiments of the invention.

Figure 1:
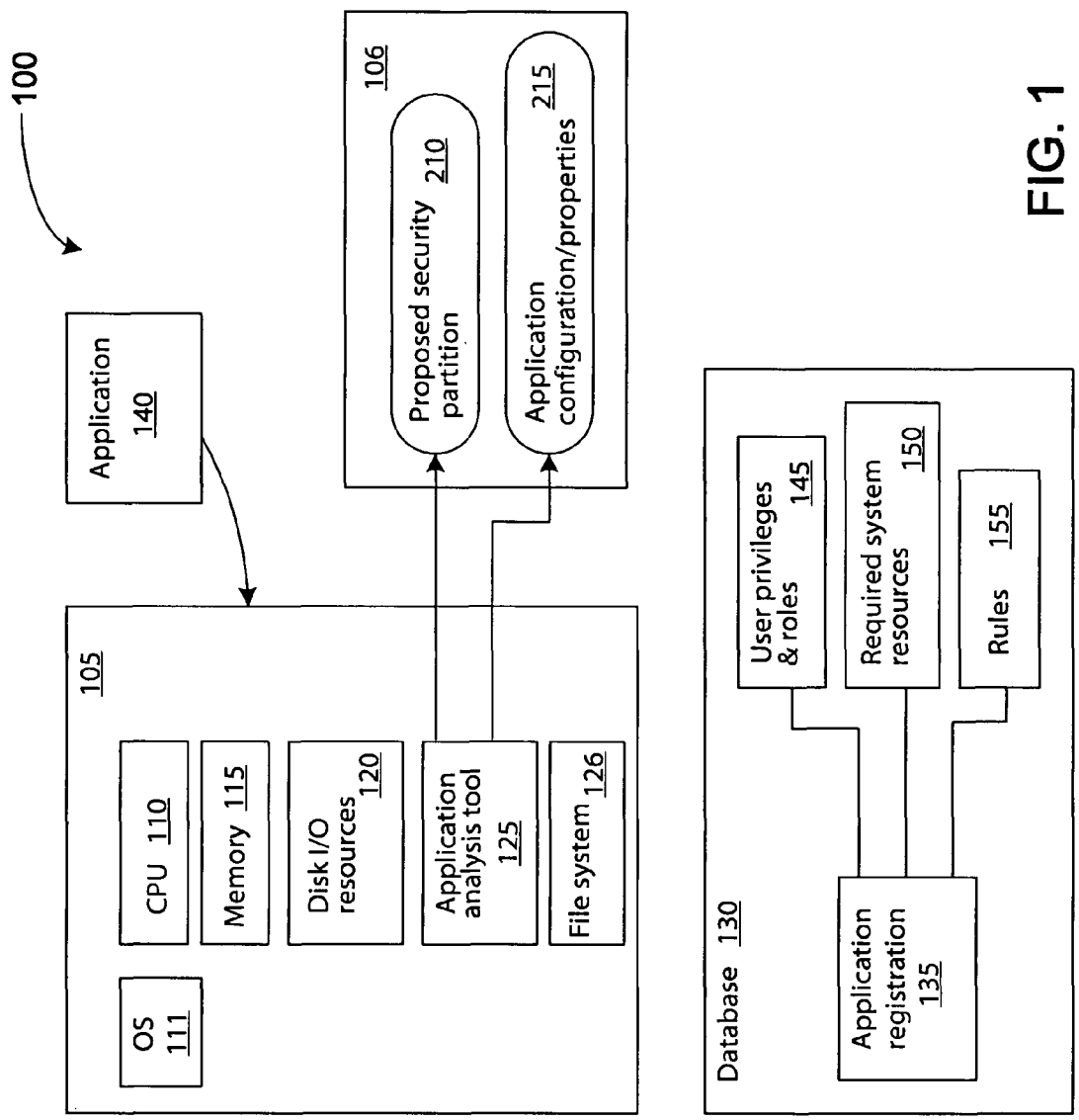
FIG. 1 is a block diagram of a system in accordance with an embodiment of the invention.

FIG. 1 is a block diagram of an apparatus (system) 100 in accordance with an embodiment of the invention. The apparatus 100 includes a computer 105. The computer 105 includes standard elements that are used in computing operations such as, for example, a CPU 110, memory resources 115, and disk input/output resources 120. The apparatus 100 also includes an operating system 111 which performs standard computing management functions and sets the security partitions in the computer 105. One example of an operating system 111 that sets security partitions in a computer is the HP-UX® 11i V2 operating system which is commercially-available from Hewlett-Packard Company. The details on the method for an operating system to set the security partitions on a computer are also discussed in detail in, for example, commonly-assigned U.S. patent application Ser. No. 11/237,865, which is hereby fully incorporated herein by reference.

In embodiments of the invention, an application analysis tool 125 can be installed in and can execute in the memory resources 115 of the computer 105. The application analysis tool 125 is software that can be programmed by use of a standard programming language (e.g., C, C++, Pascal, or other suitable languages) and can be programmed by use of standard computer programming techniques that are known to those skilled in the art.

In an embodiment of the invention, the application analysis tool 125 checks a database 130 which contains one or more application registrations 135 which are particular known software applications that have been registered in the database 130 by, for example, a network administrator, an administrator of the database 130, a user of the software application 140 or computer 105, or other permitted personnel. The database 130 can typically have other registrations 135 that are associated with other registered software programs. As an example, assume that the application registration 135 is the registration of an application 140 that a user will install into the computer 105 or has been previously installed in the computer 105. The registration 135 will contain, for example, the user privileges and roles (security requirements) 145 in the application 140, the system resources 150 that are required in the computer 105 for the application 140 so that the application 140 can run or/and run efficiently, and partition rules 155 for creating a security partition for the application 140 or for placing the application in a security partition with other applications.

A particular application 140 may have, for example, different roles such as an administrator role and a user role. A privilege is the permitted operation for a role. For example, an administrator role is generally given more privileges than a user role. The administrator role is allowed, for example, to change the configuration files in an application 140, while the user role is only permitted to use or execute the application 140. As known to those skilled in the art, roles and privileges are used in applications that implement Role Based Access Control (RBAC) which is a widely-used system for controlling access to or use of the applications.

The required system resources 150 would indicate, for example, the minimum resources that are required in the computer 105 for the application 140. These system resources include, for example, the minimum CPU resources, memory space, disk space, and disk I/O bandwidth that are required for the application 140.

The partition rules 155 can indicate, for example, if the application 140 is permitted external access to a network, and if the application 140 is permitted to send inter-process communications with particular types of applications. Based on these partition rules 155, a process of the application 140 can run within an appropriate security partition, as discussed in additional details below. As an example, partition rules 155 can also indicate which objects (e.g., files or directories in a security partition) that an application 140 is permitted to perform access operations such as reads, writes, searches, or execute operations. Examples of partition rules 155 are discussed further below in the examples discussed with reference to FIG. 2.

Figure 2:
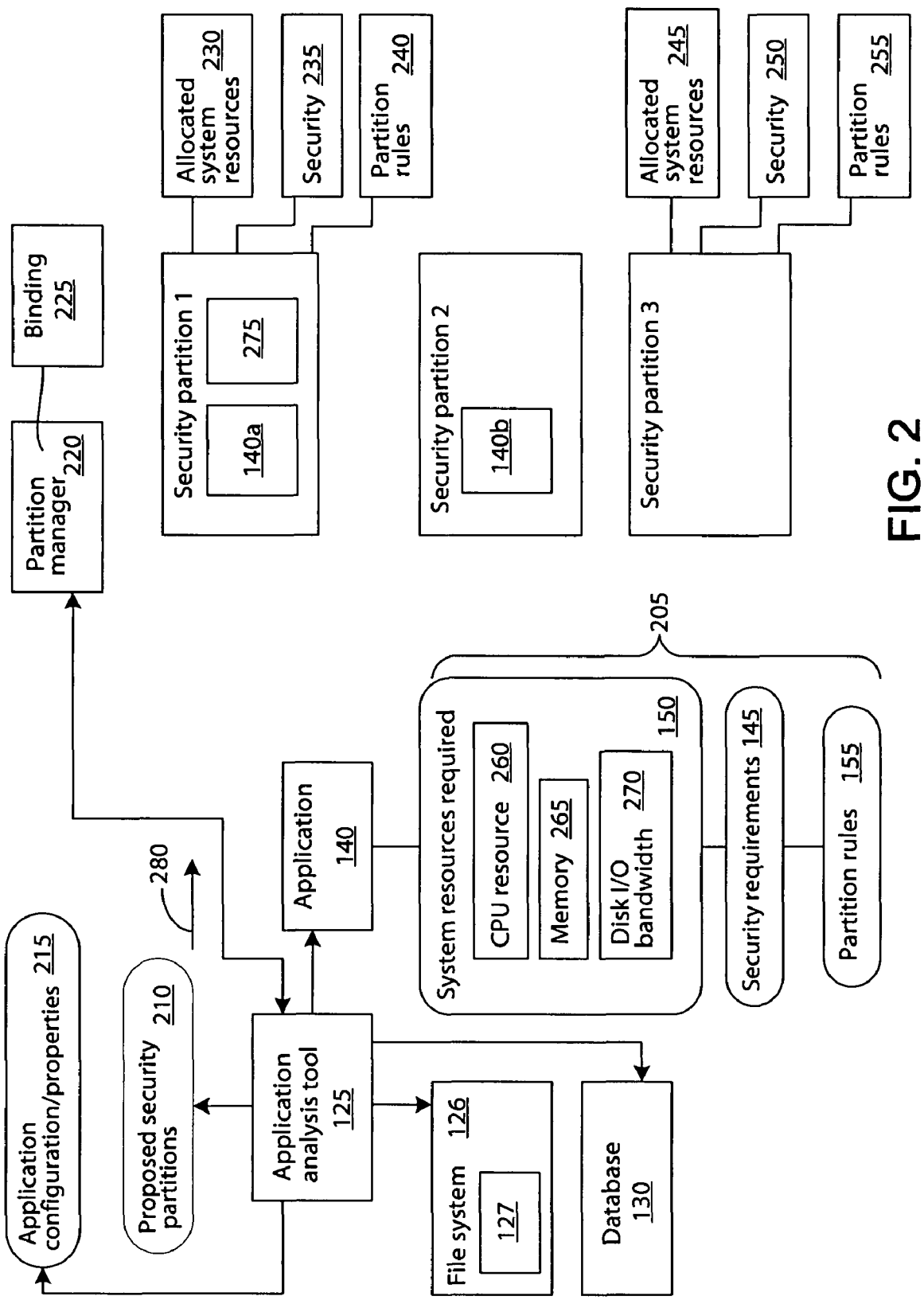
FIG. 2 is a block diagram that shows additional details of a system in accordance with an embodiment of the invention.

FIG. 2 is a block diagram that shows additional details on the operation of the application analysis tool 125, in accordance with an embodiment of the invention. As discussed above, the application analysis tool 125 checks the database 130 for the required system resources 150, security requirements (roles and privileges) 145, and partition rules 155. If the application 140 has already been installed in the computer 105 (FIG. 1), then the application analysis tool 125 can additionally check or alternatively check the file system 126 of the computer 105 for attributes 127 of the application 140. For example, the application analysis tool 125 can check the directory structure in a file system 126 and locate the attributes 127 of the application 140 by use of standard directory structure traversing methods. As an example, the attributes 127 of an application 140 may be stored in an index node in the file system 126 by a Unix file system or other file system types, and the application analysis tool 125 can read the index node to determine the configuration/properties 205 of the application 140. The configuration/properties 205 include, for example, the required system resources 150, security requirements 145, and partition rules 155 for the application 140. These configuration/properties 205 are stored as attributes or metadata that the application analysis tool 125 can check in the database 130 or file system 126, so that the application analysis tool 125 can determine the required system resources 150, security requirements 145, and partition rules 155 for the application 140. In cases where any attributes for one or more of the required system resources 150, security requirements 145, or/and partitions rules 155 for an application is not available or not applicable, the tool 125 will make the best possible match between the configuration/properties 205 of the application 140 and the characteristics/settings of the security partitions.

Based on the configuration/properties 205 of the application 140, the application analysis tool 125 can identify (and/or output via a user interface 106 in FIG. 1) one or more proposed security partitions in which a process can run for the application 140. The proposed or recommended security partition(s) is shown as output 210 in FIG. 2. If several applications 140 are installed or will be installed in the computer 105, then several security partitions may be needed for the applications 140, depending on the configuration/properties 205 of the applications, as discussed in the example below. As an option, the application analysis tool 125 can identify and then output (via user interface 106) the application configuration/properties 205 of the application 140, as determined or discovered by the application analysis tool 125. The configuration/properties 205 are viewed by the user as output 215 in the user interface 106.

A partition manager 220 creates the security partitions in an instance of the operating system 111 (FIG. 1). The partition manager 220 is discussed in further details in the above-cited commonly-assigned U.S. patent application Ser. No. 11/237,865 and an example of the partition manager 220 is implemented in the HP-UX® 11i V2 operating system which is commercially-available for Hewlett-Packard Company. Each security partition is a virtual partition (software partition) that is created by the partition manager 220 in a hardware partition. Hardware partitions are electrically isolated from each other and have their own CPU, memory, and disk I/O (input/output) resources. The security partitions in the same hardware partition will share the resources (CPU 110, memory 115, disk I/O resources 120) that are allocated to that hardware partition. A process or application that is running in one security partition can be isolated from (will not be able to communicate with) another process or application that is running in another security partition. However, as mentioned above, the partition manager 220 can set up a rule that permits a process or application in one security partition to communicate with another process or application in another security partition.

The application analysis tool 125 can communicate with the partition manager 220 so that the application analysis tool 125 can determine if a process of the application is already associated with an existing security partition. The partition manager 220 maintains a data structure (shown as binding 225) that indicates the security partition in which a process is bound to or will run in. This data structure is maintained as data in the operating system. For example, if a process 140a of the application 140 is bound to the security partition 1, and a second process 140b of the application is bound to the security partition 2, then the application analysis tool 125 will indicate the security partitions in which the one or more process of the application 140 are bound to, via output 210. Therefore, the application analysis tool 125 will identify existing partition(s), if any, that are associated with each instance of the application 140.

As another example, if the configuration/properties 205 of the application 140 does not match the allocated system resources 230, security characteristics 235, and/or partition rules 240 of the security partition 1, then the application analysis tool 125 can propose another security partition (e.g., security partition 3) with the allocated system resources 245, security characteristics 250, and partition rules 255 that satisfy the configuration/properties 205 of the application 140. For example, the security partition 3 is entitled to CPU resources, memory resources, and/or disk I/O bandwidth allocation that satisfy the CPU resource requirement (CPU cycles) 260, memory requirement 265, and/or disk I/O bandwidth requirement 270, respectively, for the application 140. As another example, the security characteristics 250 of partition 3 meets the required user privileges and user roles that is specified in the security requirement 145 of application 140. As another example, the partition rules 255 of security partition 3 satisfy the partition rules requirement 155 of application 140. For example, a partition requirement 155 of the application 140 requires each process of the application 140 to be bound in a security partition that does not contain another process from another application. Since partition 1 contains a process 275 of another application, the partition rules 240 of partition 1 do not meet the partition rules requirement 155 of application 140. As mentioned above, other types of partition rules may be applied to a security partition. For example, inter-process communications between security partitions 2 and 3 and between security partitions 1 and 3 is not permitted. However, the partition manager 220 may set a rule that permits inter-process communications between security partitions 1 and 2.

The application analysis tool 125 then identifies the security partition 3 as a proposed security partition (via output 210) for the application 140, in the above example. The user can then record or save the identified partition(s) in output 210 for later referral.

The user can then optionally perform a manual review (i.e., "sanity check") of the proposed security partitions in output 210. For example, the user can check a proposed partition(s) against the other security partitions in order to identify potential problems. This step involves the user comparing the allocated system resources, security characteristics, and partition rules of the security partitions. This step will permit the user to potentially identify any programs or user of programs (roles) that can unintentionally access more than security partition, that can potentially perform inappropriate access to data or process in a security partition, or/and check for potential unintentional sharing of system resources between security partitions that can cause the exchange of data between partitions, or/and check for potential unintentional access to insecure external communication mediums. The details in these checking steps performed by a user are known to those skilled in the art.

The user can also optionally perform a manual review (i.e., "sanity check") of all security partitions that are configured in the system resources of computer 105, in order to check for potential problems such as, e.g., poorly tuned kernel parameters, and physical system limitations (memory limitations, disk limitations, processor limitations, use of specialized encryption hardware, and other types of limitations). The particular parameters and physical system limitations that are checked by the user are known to those skilled in the art.

In an embodiment of the invention, the application analysis tool 125 will output the proposed security partitions ("Recommended Partitions") output 210 via user interface 106 (e.g. GUI screen). The application analysis tool 125 may present the output 210 at any time during or after the analysis process by the tool 125 in determining the recommended partitions that has been described in the above steps. As an example, if the analysis process for determining the recommended partitions is not yet completed, the application analysis tool 125 can inform the user accordingly and not show any output results 210 on the recommended partitions.

When the output 210 is generated, a screen (or printout) will show the list of Recommended Security Partitions based upon the existing systems configuration 205. As an example, the tool 125 can present input fields on the user interface 106 that will allow the user to accept or reject each partition that is recommended in the output 210, or accept all recommended partitions or reject all recommended partitions. As another example, by selecting a proposed security partition, the tool 125 may also present to the user additional detailed information relating to the selected partition's configuration. The user can accept or reject a recommended partition, and the tool 125, as an option, can inform the user that the system in the computer 105 is about to be configured. The partition manager 220 (FIG. 2) can create a new security partition that is selected by the user for binding the application 140, or bind an application 140 to an existing security partition that is selected by the user.

In one embodiment, the tool 125 transmits an identifier 280 that identifies the selected recommended security partition to the partition manager 220, so that the partition manager 220 can create a new security partition and bind the application 140 to that new security partition or bind the application 140 to a selected existing security partition. The new security partition or existing security partition that will run a process of the application 140 is identified in the identifier 280. The identifier 280 can be in any suitable data format for an input command that can be received and processed by the partition manager 220, so that the partition manager 220 can create a new security partition and bind the application 140 to that new security partition in response to the identifier 280 or/and so that the partition manager 220 can bind the application 140 to the selected security partition in response to the identifier 280. Therefore, the data format of the identifier 280 may depend upon the particular implementation of the partition manager 220. Alternatively, the user can input the identifier 280 via a user input command in the user interface 106 to the partition manager 220 so that the partition manager 220 can create a new security partition and bind the application 140 to that new security partition or bind the application 140 to a selected existing security partition.

The partition manager 220 can also log any results for future reference after creating a security partition. The operating system 111 (FIG. 1) can also perform post-configuration processing and reboot of the computer 105 system (if necessary) after the partition manager 220 has created a partition.

The apparatus 100 therefore includes an application analysis tool (software program) 105 that inspects the configuration/properties 205 of applications 140 in a computer system 105 and recommends security partitions based on the applications 140 that are currently installed on the system (or will be installed in the system) and the user's desired level of security. The user's desired level of security can be specified in the security requirements 145 or are set to default values.

The advantages provided by the tool 125, in combination with use of the partition manager 220 include, for example, the ability to quickly and efficiently subdivide a system into security partitions based upon a desired set of open-source applications and commercial applications and overall level of system security, and the ability to configure the security partitions without the tedious manual configuration of previous approaches.

The tool 105 has advantages over the previous manual process because the tool 105 automates the process of inspecting a system for potential security partitions, automates the process of creating the security partitions (when used with the partition manager), and understands the security characteristics of many commonly-used open-source applications and commercial applications.

Figure 3:
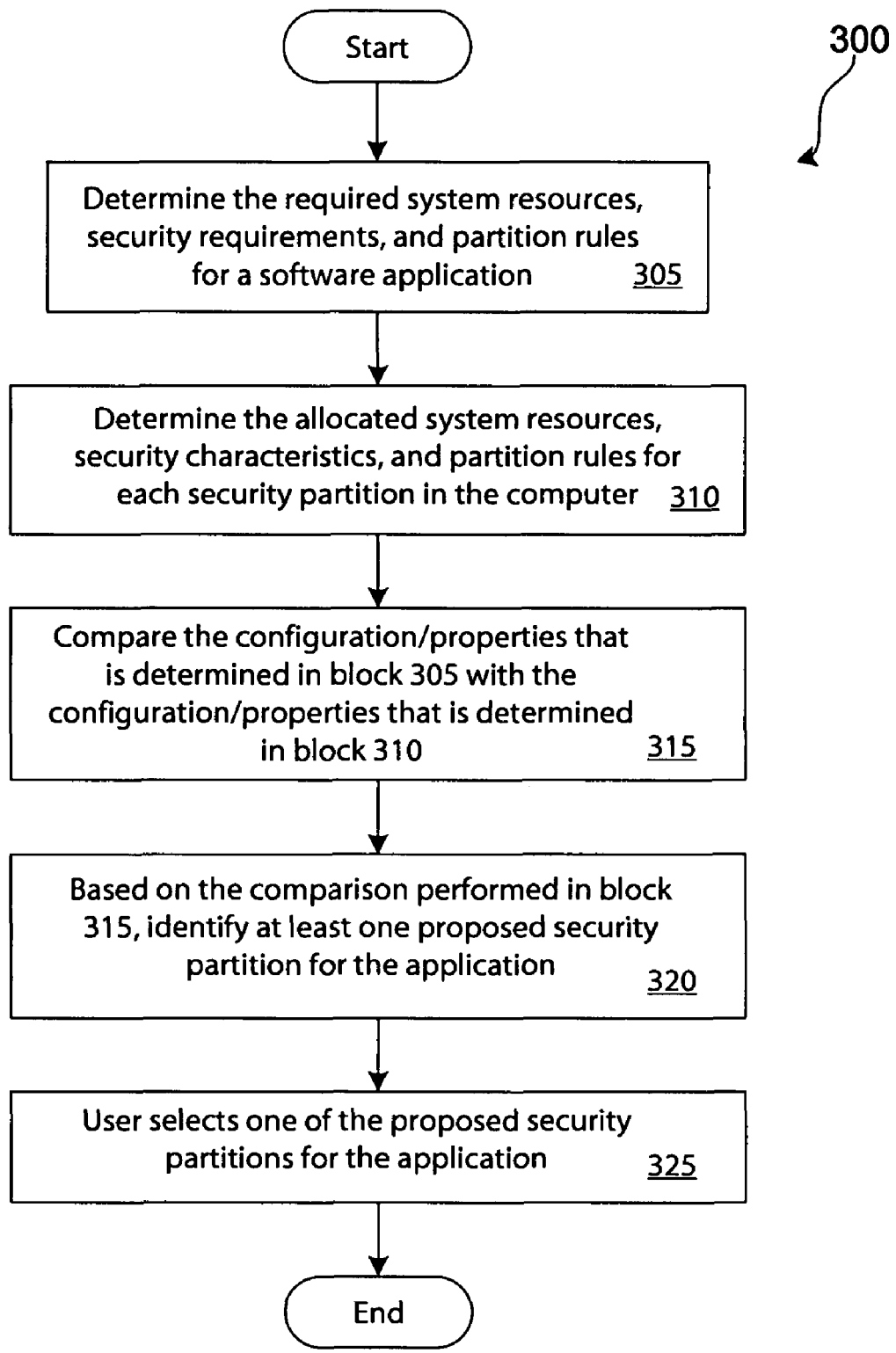
FIG. 3 is a flow diagram of a method in accordance with an embodiment of the invention.

FIG. 3 is a flow diagram of a method 300 in accordance with an embodiment of the invention. In block 305, the application analysis tool 125 determines the required system resources, security requirements, and partition rules for a software application 140. The application analysis tool 125 determines these configuration/properties of the application 140 by checking the attributes or metadata of the application 140 in a database 130 or the file system 126.

In block 310, the application analysis tool 125 determines the allocated system resources, security characteristics, and partitions rules for each security partition in the computer.

In block 315, the application analysis tool 125 compares the configuration/properties that is determined in block 305 with the configuration/properties that is determined in block 310.

In block 320, the application analysis tool 125 identifies at least one proposed security partition for the application, based on the comparison that the application analysis tool 125 performs in block 315.

In block 325, the user selects one of the proposed security partitions (or selects the proposed security partition) for the application 140.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for determining a security partition in a computer for an application, the method comprising:
   determining required system resources, security requirements, and partition rules for an application by use of an application analysis tool;
   determining allocated system resources, security characteristics, and partition rules for each security partition in the computer;
   comparing the required system resources, security requirements, and partition rules for the application to the allocated system resources, security characteristics, and partition rules for each security partition in the computer; and
   identifying, by the application analysis tool, at least one proposed security partition for the application based on the comparison.

2. The method of claim 1, wherein determining the required system resources, security requirements, and partition rules for the application comprises: checking a database that stores configuration information that is associated with the application.

3. The method of claim 1, wherein determining the required determining system resources, security requirements, and partition rules for the application comprises: checking a file system that stores configuration information that is associated with the application if the application is installed in the computer.

4. The method of claim 1, further comprising:
   selecting, by a user, a proposed security partition for the application.

5. The method of claim 1, wherein the required system resources for the application comprise a CPU resource, memory resource, and disk input/output bandwidth.

6. The method of claim 1, wherein the security requirements for the application comprise roles and privileges associated with the application.

7. The method of claim 1, wherein the partition rules for the application comprise constraints on communications by the application.

8. The method of claim 1, wherein the partition rules for the application comprise permitted access operations by the application on an object in a security partition.

9. The method of claim 1, further comprising:
   transmitting a selected proposed security partition to a partition manager for creating the selected proposed security partition or binding the application to an existing security partition.

10. An apparatus for determining a security partition in a computer for an application, the apparatus comprising:
    an application analysis tool configured to determine required system resources, security requirements, and partition rules for an application, determine allocated system resources, security characteristics, and partition rules for each security partition in the computer, compare the required system resources, security requirements, and partition rules for the application to the allocated system resources, security characteristics, and partition rules for each security partition in the computer; and identify at least one proposed security partition for the application based on the comparison.

11. The apparatus of claim 10, wherein the application analysis tool is configured to check a database that stores configuration information that is associated with the application.

12. The apparatus of claim 10, wherein the application analysis tool is configured to check a file system that stores configuration information that is associated with the application if the application is installed in the computer.

13. The apparatus of claim 10, wherein a user selects a proposed security partition for the application.

14. The apparatus of claim 10, wherein the required system resources for the application comprise a CPU resource, memory resource, and disk input/output bandwidth.

15. The apparatus of claim 10, wherein the security requirements for the application comprise roles and privileges associated with the application.

16. The apparatus of claim 10, wherein the partition rules for the application comprise constraints on communications by the application.

17. The apparatus of claim 10, wherein the partition rules for the application comprise permitted access operations by the application on an object in a security partition.

18. The apparatus of claim 10, wherein the application analysis tool is configured to transmit a selected proposed security partition to a partition manager for creating the selected proposed security partition or binding the application to an existing security partition.

19. An apparatus for determining a security partition in a computer for an application, the apparatus comprising:
    means for determining required system resources, security requirements, and partition rules for an application;
    means for determining allocated system resources, security characteristics, and partition rules for each security partition in the computer;
    means for comparing the required system resources, security requirements, and partition rules for the application to the allocated system resources, security characteristics, and partition rules for each security partition in the computer; and
    means for identifying at least one proposed security partition for the application based on the comparison.

20. An article of manufacture comprising:
    a machine-readable medium having stored thereon instructions to:
    determine required system resources, security requirements, and partition rules for an application;
    determine allocated system resources, security characteristics, and partition rules for each security partition in the computer;
    compare the required system resources, security requirements, and partition rules for the application to the allocated system resources, security characteristics, and partition rules for each security partition in the computer; and
    identify at least one proposed security partition for the application based on the comparison.

* * * * *